(12) United States Patent
Pawar et al.

(10) Patent No.: US 9,460,177 B1
(45) Date of Patent: Oct. 4, 2016

(54) MANAGING UPDATING OF METADATA OF FILE SYSTEMS

(71) Applicants: Sitaram Pawar, Shrewsbury, MA (US); Jean-Pierre Bono, Westborough, MA (US); Philippe Armangau, Acton, MA (US)

(72) Inventors: Sitaram Pawar, Shrewsbury, MA (US); Jean-Pierre Bono, Westborough, MA (US); Philippe Armangau, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 314 days.

(21) Appl. No.: 13/626,247

(22) Filed: Sep. 25, 2012

(51) Int. Cl.
*G06F 17/00* (2006.01)
*G06F 17/30* (2006.01)

(52) U.S. Cl.
CPC ............................. *G06F 17/30575* (2013.01)

(58) Field of Classification Search
CPC .................. G06F 17/30174; G06F 17/30575; G06F 17/30286; G06F 17/30067
USPC ........................................ 707/610, 620, 648
See application file for complete search history.

(56) References Cited

U.S. PATENT DOCUMENTS

| | | | |
|---|---|---|---|
| 7,783,615 B1* | 8/2010 | Compton et al. | 707/694 |
| 7,873,619 B1* | 1/2011 | Faibish et al. | 707/705 |
| 8,204,871 B1* | 6/2012 | Pawar et al. | 707/705 |
| 8,806,096 B1* | 8/2014 | Patil | G06F 3/0689 710/74 |
| 2005/0065986 A1* | 3/2005 | Bixby et al. | 707/204 |
| 2007/0260842 A1* | 11/2007 | Faibish | G06F 3/061 711/170 |

\* cited by examiner

*Primary Examiner* — Rehana Perveen
*Assistant Examiner* — Loc Tran
(74) *Attorney, Agent, or Firm* — Krishnendu Gupta; Jason A. Reyes; Deepika Bhayana

(57) ABSTRACT

A method is used in managing updating of metadata of file systems. A reference to a change to metadata of a file of a file system is stored in a global sync list configured to store changes to metadata of a plurality of files of a plurality of file systems. The change to the metadata of the file is stored in a journal upon receiving an I/O request for the file of the file system. The journal includes metadata transactions upon the plurality of files of the plurality of the file system. The change to the metadata of the file of the file system is applied to metadata of the file system organized on a storage device using the reference to the change stored in the global sync list.

20 Claims, 8 Drawing Sheets

MANAGING UPDATING OF METADATA OF FILE SYSTEMS

BACKGROUND

1. Technical Field

This application relates to managing updating of metadata of file systems.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

An operating system, executing on a data storage system such as a file server, controls the allocation of a memory of the data storage system to host systems or clients connected to the data storage system. Allocation is generally performed at a page granularity, where a page is a selected number of contiguous blocks. The particular size of a page is typically a function of an operating system, the page size may be 8 kilobytes (KB).

To the operating system of a data storage system, a file system is a collection of file system blocks of a specific size. For example, the size of a file system block may be 8 kilobytes (KB). As the data storage system is initialized, some of the pages are reserved for use by the operating system, some pages are designated as 'free' for allocation to other applications, and a large chunk of pages are reserved to provide a buffer cache (also referred to as "buffer cache pool"). The buffer cache temporarily stores pages in a volatile memory of a data storage system that are also stored in an attached disk device to increase application performance.

File systems typically include metadata describing attributes of a file system and data from a user of the file system. A file system contains a range of file system blocks that store metadata and data. A user of a filesystem access the filesystem using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in an hierarchy depending upon the size of a file where each level of indirect blocks includes pointers to indirect blocks at the next lower level.

A write I/O request using a "file sync" option requires that a write operation directed to a file writes both data and metadata immediately to a disk rather than incurring a delay. However data and metadata may still be written into a cache. On the other hand, a write I/O request using a "data sync" option requires that data is written immediately to a disk but metadata may be cached in a memory and a file system transaction log and flushed to the disk at a later time.

SUMMARY OF THE INVENTION

A method is used in managing updating of metadata of file systems. A reference to a change to metadata of a file of a file system is stored in a global sync list configured to store changes to metadata of a plurality of files of a plurality of file systems. The change to the metadata of the file is stored in a journal upon receiving an I/O request for the file of the file system. The journal includes metadata transactions upon the plurality of files of the plurality of the file system. The change to the metadata of the file of the file system is applied to metadata of the file system organized on a storage device using the reference to the change stored in the global sync list.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
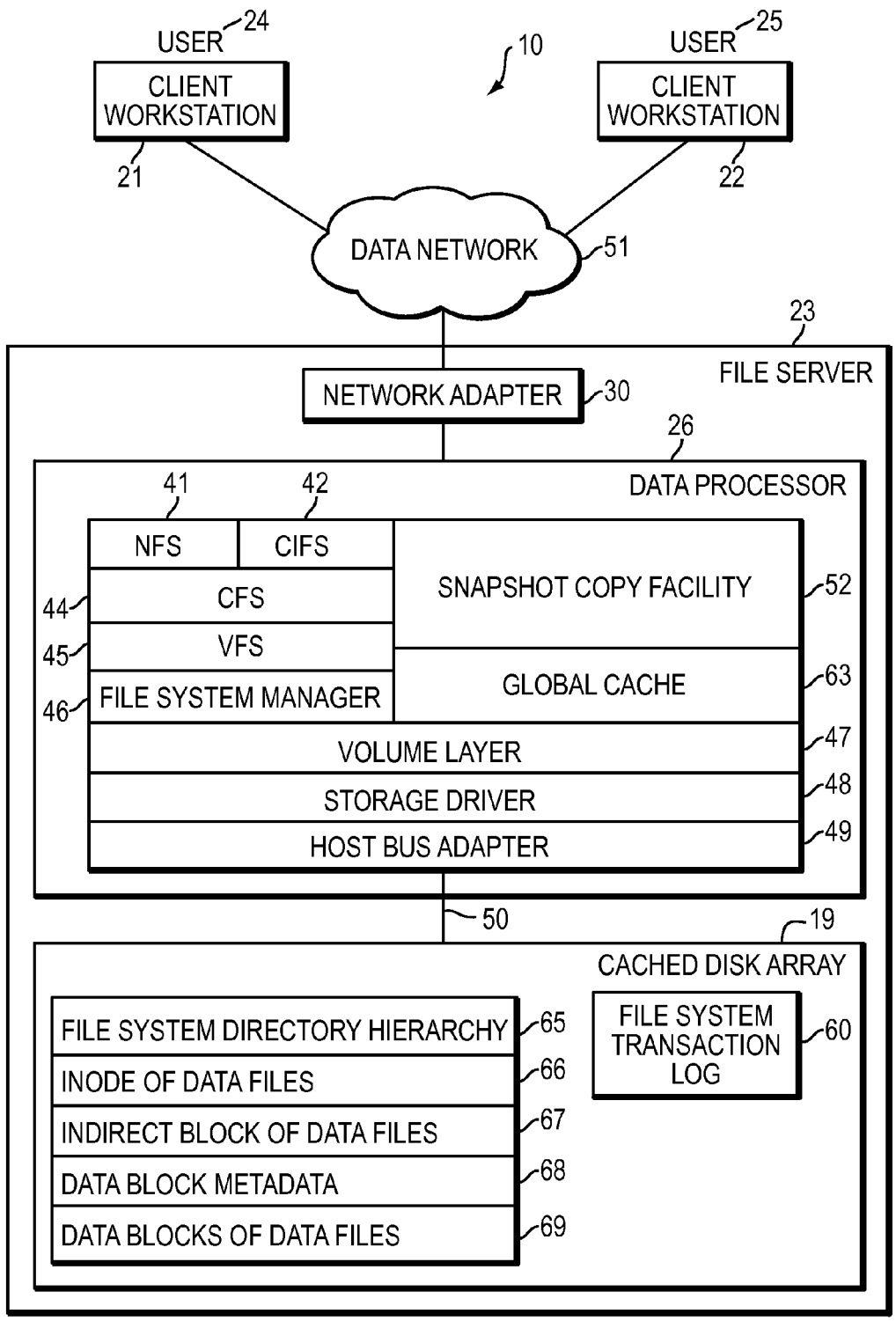
FIG. 1 is an example of an embodiment of a computer system that may utilize the techniques described herein.

Described below is a technique for use in managing updating of metadata in file systems, which technique may be used to provide, among other things, storing a reference to a change to metadata of a file of a file system in a global sync list configured to store changes to metadata of a plurality of files of a plurality of file systems, where the change to the metadata of the file is stored in a journal upon receiving an I/O request for the file of the file system, where the journal includes metadata transactions upon the plurality of files of the plurality of the file system, and applying the change to the metadata of the file of the file system to metadata of the file system organized on a storage device using the reference to the change stored in the global sync list.

Typically, data and metadata of a file of a file system read from a disk and written to a disk may be cached in a memory such as a system cache of a data storage system. Caching of data and metadata of a file implies that read operations read data and metadata of the file from the memory, rather than from a disk. Correspondingly, write operations may write data and metadata of a file to the memory rather than to a disk. Generally, caching data and metadata of a file of a file system in a memory improves performance of the file system as accessing data from a disk involves an I/O operation to a disk which is slower than accessing data from the memory. Data and metadata of a file cached in the memory is written to the disk at intervals determined by an operating system of the data storage system, which is referred to as flushing of a cache.

A buffer cache pool is created from a portion of a volatile memory of a data storage system where the portion of the volatile memory is apportioned into buffer cache objects (also referred to as "buffer cache page" or "buffer cache block") in such a way that each buffer cache object is represented by a buffer cache descriptor. The buffer cache pool provides buffer cache blocks to applications for storing data and/or metadata of a file system. The buffer cache pool manages allocation, caching and deallocation of buffer cache blocks by adding the buffer cache blocks to any one of queues (or lists) managed by the buffer cache pool. The buffer cache pool caches metadata of a file system which includes directory contents, file status information (e.g., access time, last modification time, size, permission bits), and file system structures (such as indirect blocks, inode, cylinder group blocks and per-block metadata).

Generally, an I/O request is executed by reading data from a persistent storage into a buffer of the buffer cache pool if the data is not already cached and completing the I/O request by performing the I/O operation on the data read into the buffer. A global cache is used to improve I/O performance and decrease read and write I/O latency by caching data and/or metadata of a file in the global cache, logging the changes in a file system transaction log, and flushing (also referred to herein as "committing") the changes to a storage device at a later time.

Typically, an operation such as a file sync writes metadata of a file cached in a memory (e.g., global metadata cache) of a data storage system to a persistent storage at a pre-determined fixed time interval. Further, metadata (e.g., directory blocks, indirect blocks, inode blocks, cylinder group blocks, per-block metadata, slicemap information) of a file of a file system cached in a memory of a data storage system is flushed periodically (such as every 30 seconds) to a persistent storage. Further, metadata of a file system may be flushed to a persistent storage based on either a specific pre-determined threshold value or in response to a specific condition such as low available memory.

If a file block on a persistent storage includes an updated version of metadata compared to metadata stored in an in-memory buffer (e.g., a buffer cache block of a buffer cache pool) associated with the file block, the in-memory buffer is referred to as a dirty buffer (also referred to herein as "dirty metadata buffer"). Further, contents of the dirty in-memory buffer are flushed by a file sync operation to the persistent storage in order to ensure that a single location on the persistent storage stores the up-to-date metadata for the file block. Typically, a dirty buffer results from an unstable (also referred to as "asynchronous") write operation. Thus, a process of flushing metadata of a file system commits (also referred to as "writes") the metadata from dirty buffers cached in a file system cache to the file system stored on a persistent storage. Further, changes to metadata that are stored in dirty buffers in a memory may include modifications to the inode of a file, any new of modified indirect blocks, and any modified quota reservations.

Further, a file system is associated with a dirty list that refers to metadata such as cylinder group block entries that have been written to a file system transaction log for the file system but metadata stored on a persistent storage (e.g., disk) have not been updated. Further, a metadata entry is added to a dirty list of a file system when the metadata entry is written to a file system transaction log. Further, metadata information stored in an entry of a dirty list is transferred (also referred to as "flushed") to a persistent storage either by a file sync operation at the time data and/or metadata of a file system is updated or at a later time when a number of entries in the dirty list exceeds a pre-determined threshold.

Generally, a storage system includes a file system transaction log that stores metadata transactions for a file system organized on the storage system. In such a system, when a sync process flushes a dirty metadata of a file system to on-disk representation of the metadata, the corresponding metadata entry on the file system transaction log for the dirty metadata is marked as finished and becomes available as a free entry.

Conventionally, each file system is managed by a separate sync process that flushes dirty metadata of the file system which is cached in global caches to on-disk representation of the dirty metadata at a predetermined fixed time intervals. In such a conventional system, each file system of a data storage system flushes its dirty metadata in an order in which the dirty metadata appears on hash lists maintained by that file system where the hash lists are used to reference the dirty metadata cached in global caches of the data storage system. In such a conventional system, dirty metadata of file systems is flushed in an order in which the dirty metadata appears on respective hash lists maintained by each of the file systems. Further, in such a conventional system, the order in which dirty metadata of file systems appears on respective hash lists of each of the file systems does not reflect the order in which the dirty metadata transactions metadata appears on a file system transaction log of a storage system Further, each sync process flushes dirty metadata of respective file system managed by that sync process without any relation with how sync processes flushes metadata for other file systems. As a result, in such a conventional system, metadata entries of a file system transaction log of a storage system are flushed in a random order because the order in which metadata entries are flushed from the file system transaction log is different from the order in which metadata entries are written to the file system transaction thereby creating holes in the file system transaction log. Thus, in such a conventional system, a file system transaction log includes free entries that appear in between other entries that have not been flushed to a storage device yet. Consequently, in such a conventional system, because new entries can only be added at the end of a file system transaction log, free available entries that appear in between other used entries within the global transaction log can not be used thereby causing a transaction log full condition even though the file system transaction log has free entries available for reuse.

By contrast, in at least some implementations in accordance with the current technique as described herein, a global sync list is used to maintain references to dirty metadata of a set of file systems of a data storage system in an order which is same as the order in which the dirty metadata appears on a file system transaction log. Thus, in least some implementations in accordance with the technique as described herein, dirty metadata of a set of file systems is flushed to a storage device by a log sync process which uses the global sync list for flushing the dirty metadata of the set of file systems. Further, the global sync list of a storage system includes references to metadata changes associated with a set of file system organized on the storage system in an order which is same as the order in which the metadata changes are stored on a file system transaction log. Further, in at least one embodiment of the current technique, the global sync list enables a storage system to flush metadata based on different flush order priority schemes, if required.

In at least some implementations in accordance with the technique as described herein, the use of the managing updating metadata of file systems technique can provide one or more of the following advantages: providing effective use of the space in a file system transaction log by flushing metadata entries of the file system transaction log in an order (e.g., first-in-first-out) in which the metadata entries appear on the file system transaction log, and improving I/O performance by efficiently flushing metadata entries of the file system transaction log.

It should be noted that within this document the term "I/O request" may be used interchangeably with the term "I/O operation" to represent an I/O operation performed on a file system.

Referring now to FIG. 1, shown is an example of an embodiment of a computer system such as a data storage system that may be used in connection with performing the technique or techniques described herein. The data storage system 10 includes a data network 20 interconnecting clients 21, 22 and a data storage system such as a network file server 23 (also referred to simply as "file server"). The data network 20 may include any one or more of network connection technologies, such as Ethernet, and communication protocols, such as TCP/IP. The clients 21, 22, for example, are workstations such as personal computers. The workstations are operated by users 24, 25. The user 25 is a system administrator having sufficient privileges for configuring the network file server 23 and for receiving status and error messages from the network file server. Clients 21, 22 may access the network file server 23, for example, in performing input/output (I/O) operations, data requests, and other operations.

Various aspects of the network file server 23 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, Jiang et al., U.S. Patent Application Publication 2005/0240628, published Oct. 27, 2005, incorporated herein by reference, and Jiang et al., U.S. Patent Application Publication 2004/0059822-A1 published Mar. 25, 2004, incorporated herein by reference.

The network file server 23 includes at least one data processor 26 and a cached disk array 19. The data processor 26, for example, is a commodity computer. The cached disk array 19 includes multiple disk drives, a high-speed random-access cache memory, and a logical-to-physical mapping between the cache memory and the disk drives.

The data processor 26 has a network interface 30 for communication of data packets over the data network 51 via a data transmission protocol such as TCP/IP. The data processor 26 is programmed with a Network File System (NFS) module 41 for supporting communication with network clients over the data network 51 using the NFS file access protocol, and a Common Internet File System (CIFS) module 42 for supporting communication with network clients over the data network using the CIFS file access protocol. The NFS module 41, and the CIFS module 42 are layered over a Common File System (CFS) module 44, and the CFS module is layered over a Virtual File System (VFS) module 45. The VFS module 45 is layered over a Universal File System (UxFS) module. The UxFS module is a file system manager 46 for managing a file system such as a UNIX-based file system. The CFS module 44 provides higher-level functions common to NFS 41 and CIFS 42.

The file system manager 46 accesses data organized into logical volumes defined by a logical volume layer module 47. Each logical volume maps to contiguous logical storage addresses in the cached disk array 19. The logical volume layer module 47 is layered over a storage driver 48 such as a Fibre-Channel (FC), a Small Computer System Interface (SCSI), and an Internet SCSI (iSCSI) driver. The data processor 26 sends storage access requests through a host bus adapter 49 using a storage protocol such as the FC, SCSI, or iSCSI used by the storage driver 48, depending on the physical data link 50 between the data processor 26 and the cached disk array 19.

Referring again to FIG. 1, the CFS module 44, the VFS module 45, the file system manager 46, the logical volume layer 47, and the storage driver 48 are modules of an operating system program executing on file server 23. The NFS module 41, and CIFS module 42 are internal application programs supported by the operating system. The data processor 26 is programmed with additional internal application programs including a snapshot copy facility 52.

The data network 20 may be any one or more of a variety of networks or other type of communication connections as known to those skilled in the art. For example, the data network 51 may be the Internet, an intranet, network or other wireless or other hardwired connection(s) by which the clients 21, 22 may access and communicate with the network file server 23, and may also communicate with other components (not shown) that may be included in the network file server 23. Each of clients 21, 22 and the network file server 23 may be connected to the data network 20 by any one of a variety of connections as may be provided and supported in accordance with the type of data network 20.

The processors included in the clients 21, 22 and data processor 26 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the network file server 23 are described herein in more detail, and may vary with each particular embodiment. Each of the clients 21, 22 and the network file server 23 may all be located at the same physical site, or, alternatively, may also be located in different physical locations. Some or all of the connections by which the clients 21-22 and the network file server 23 may be connected may pass through other communication devices, such as a Connectrix or other switching equipment that may exist such as a phone line, a repeater, a multiplexer or even a satellite.

Figure 2:
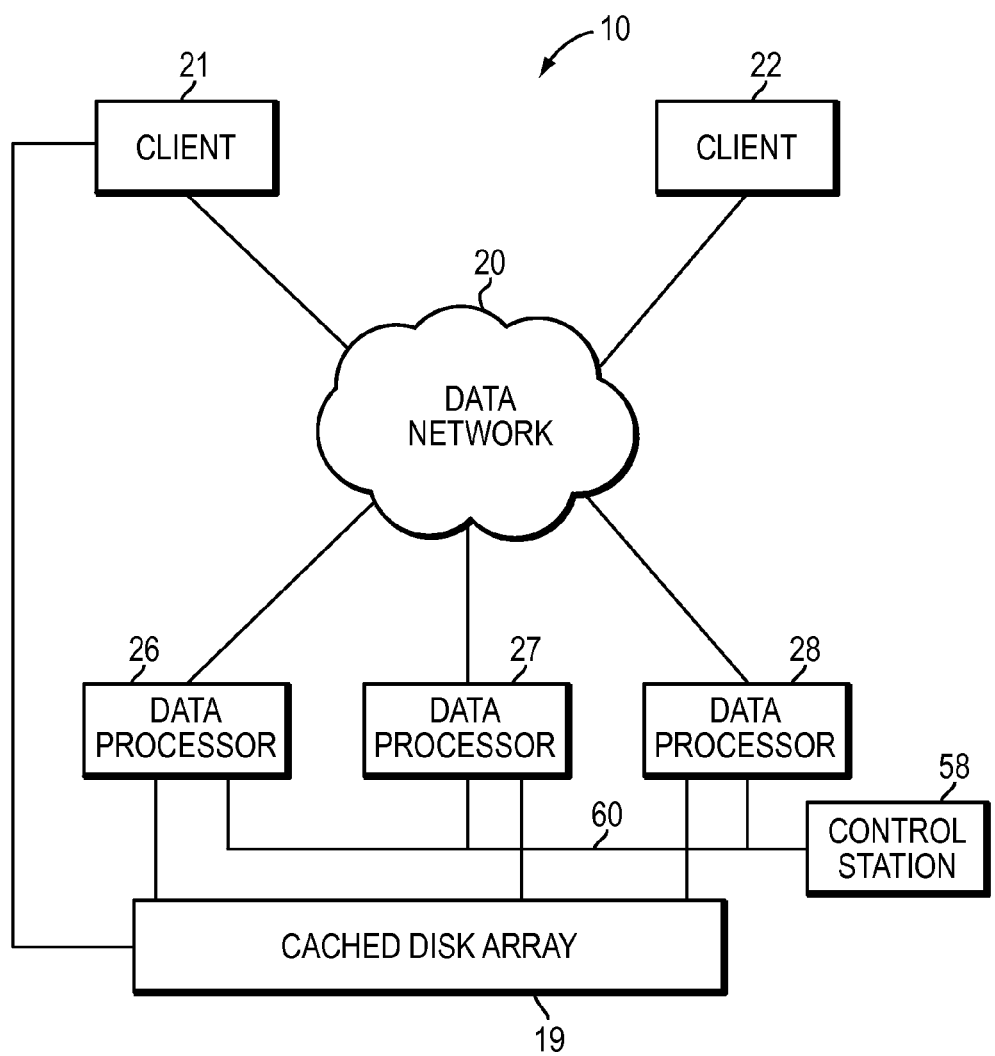
FIG. 2 is an example of an embodiment of a computer system that may utilize the techniques described herein.

Each of the clients 21, 22 may perform different types of data operations in accordance with different types of tasks. In the embodiment of FIG. 2, any one of the clients 21, 22 may issue a data request to the network file server 23 to perform a data operation. For example, an application executing on one of the clients 21, 22 may perform a read or write operation resulting in one or more data requests to the network file server 23.

An embodiment of the data storage system 10 may include one or more network file servers. Each of the network file server may include one or more data storage devices, such as disks. Each of the network file server included in data storage system 10 may be inter-connected (not shown). Additionally, the network file servers may also be connected to the clients through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the clients, for example, to the network file server 23.

It should be noted that each of the network file server may operate stand-alone, or may also included as part of a storage area network (SAN) that includes, for example, other components such as other network file servers.

Each of the network file servers of element 10 may include a plurality of disk devices or volumes. The particular network file server and examples as described herein for purposes of illustration should not be construed as a limitation. Other types of commercially available data storage systems, as well as processors and hardware controlling access to these particular devices, may also be included in an embodiment.

Clients, such as 21, 22, provide data and access control information through channels to the storage systems, and the storage systems may also provide data to the clients also through the channels. The clients do not address the disk drives of the storage systems directly, but rather access to data may be provided to one or more clients from what the clients view as a plurality of file systems. A file system is created from a logical device or logical volume. The logical volume may or may not correspond to an actual disk drive. For example, one or more logical volumes may reside on a single physical disk drive. Data in a single storage system may be accessed by multiple clients allowing the clients to share the data residing therein. A LUN (logical unit number) may be used to refer to one of the foregoing logically defined devices or volumes.

In such an embodiment in which element 10 of FIG. 1 is implemented using one or more data storage systems, each of the data storage systems may include code thereon for performing the techniques as described herein. In following paragraphs, reference may be made to a particular embodiment such as, for example, an embodiment in which element 10 of FIG. 2 includes a single data storage system, multiple data storage systems, a data storage system having multiple data processors, and the like. However, it will be appreciated by those skilled in the art that this is for purposes of illustration and should not be construed as a limitation of the techniques herein. As will be appreciated by those skilled in the art, the network file server 23 may also include other components than as described for purposes of illustrating the techniques herein.

As shown in the data storage system 10 in FIG. 1, a file system stored on a storage device is organized as a hierarchy. At the top of the hierarchy is a hierarchy of the directories 65 in the file system. Inodes of data files 66 depend from the file system directory hierarchy 65. Indirect blocks of data files 67 depend from the inodes of the data files 66. Data block metadata 68 and data blocks of data files 69 depend from the inodes of data files 66 and from the indirect blocks of data files 67. Specific examples of this hierarchy are further described below with reference to FIGS. 3 and 4. File systems typically include metadata describing attributes of a file system and data from a user of the file system. A file system contains a range of file system blocks that store metadata and data. In at least some embodiments of the current technique, the file system block may be 8 kilobytes (KB) in size. Further, a user of data storage system 10 creates files in a file system.

The data storage system 10 also includes journal such as a file system transaction log 60. In at least one embodiment of the current technique, a journal may include a persistent log or a persistent file that may be used to update metadata of a file system stored on a persistent storage. Generally, any change in metadata of a file system may first be written to file system transaction log 60. Metadata information stored in the file system transaction log 60 is later used to recover the file system when file server 23 reboots due to a failure. Upon reboot of file server 23, file system transaction log 60 is inspected to find a last valid transaction recorded in the log 60, and the last valid transaction is applied to the file system stored on a persistent storage for updating metadata of the file system by using metadata information stored in file system transaction log 60. Further, global cache 63 stores metadata of a file of a file system in a volatile memory of data storage system 10.

In at least one embodiment of the current technique, a global cache may store data and/or metadata of a file of a file system in a volatile memory of data storage system 10. Further, a global cache may be initialized at the time file server 23 is initialized. A global cache may be created in a volatile (e.g., Direct Random Access Memory (DRAM) of file server 23. Further, a global cache may also be created in a nonvolatile memory of file server 23. Further, in at least one embodiment of the current technique, a nonvolatile memory may include a flash memory (e.g. solid state drives, EEPROM (electrically erasable programmable read-only memory)). Further, it should be noted that a global cache may include a global data cache and a global metadata cache. Further, a global cache may cache both data and metadata of a file system.

Referring now to FIG. 2, shown is the network file server 23 of FIG. 1 that may further include a control station 58 and additional data processors (such as data processors 27, 28) sharing the cached disk array 19. A dual-redundant data link 60 interconnects the data processors 26, 27, 28 to the control station 58. The control station 58 monitors a heartbeat signal from each of the data processors 26, 27, 28 in order to detect a data processor failure. If a failed data processor cannot be successfully re-booted, the control station 58 will "fence off" the failed data processor and re-assign or fail-over the data processing responsibilities of the failed data processor to another data processor in the network file server 23. The control station 58 also provides a user interface between the system administrator 25 and the network file server 23.

Figure 3:
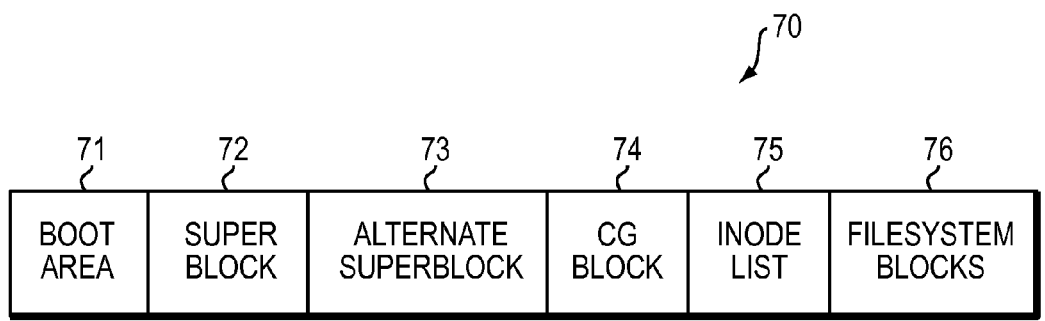
FIGS. 3-6 are diagrams illustrating in more detail components that may be used in connection with techniques herein.

Referring to FIG. 3, shown is a representation of an on-disk layout of a file system that may be included in an embodiment using the current techniques described herein. A file system 70 includes a boot area 71, a superblock 72, an alternate superblock 73, Cylinder Group (CG) block 74, an inode list 75, and file system blocks 76. The boot area 71 may contain code for booting an operating system of file server 23. The superblock 72 and alternate super block 73 contains attributes and metadata of the file system. Cylinder Group block 74 contains metadata information pertaining to cylinder groups of the file system. Inode list 75 includes the list of all inodes of each file that is present in the file system.

A file system 70 includes one or more file system blocks 76. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. However, it should be noted that a file system may be organized based on any one of the known mapping techniques such as an extent based binary tree mapping mechanism.

Figure 4:
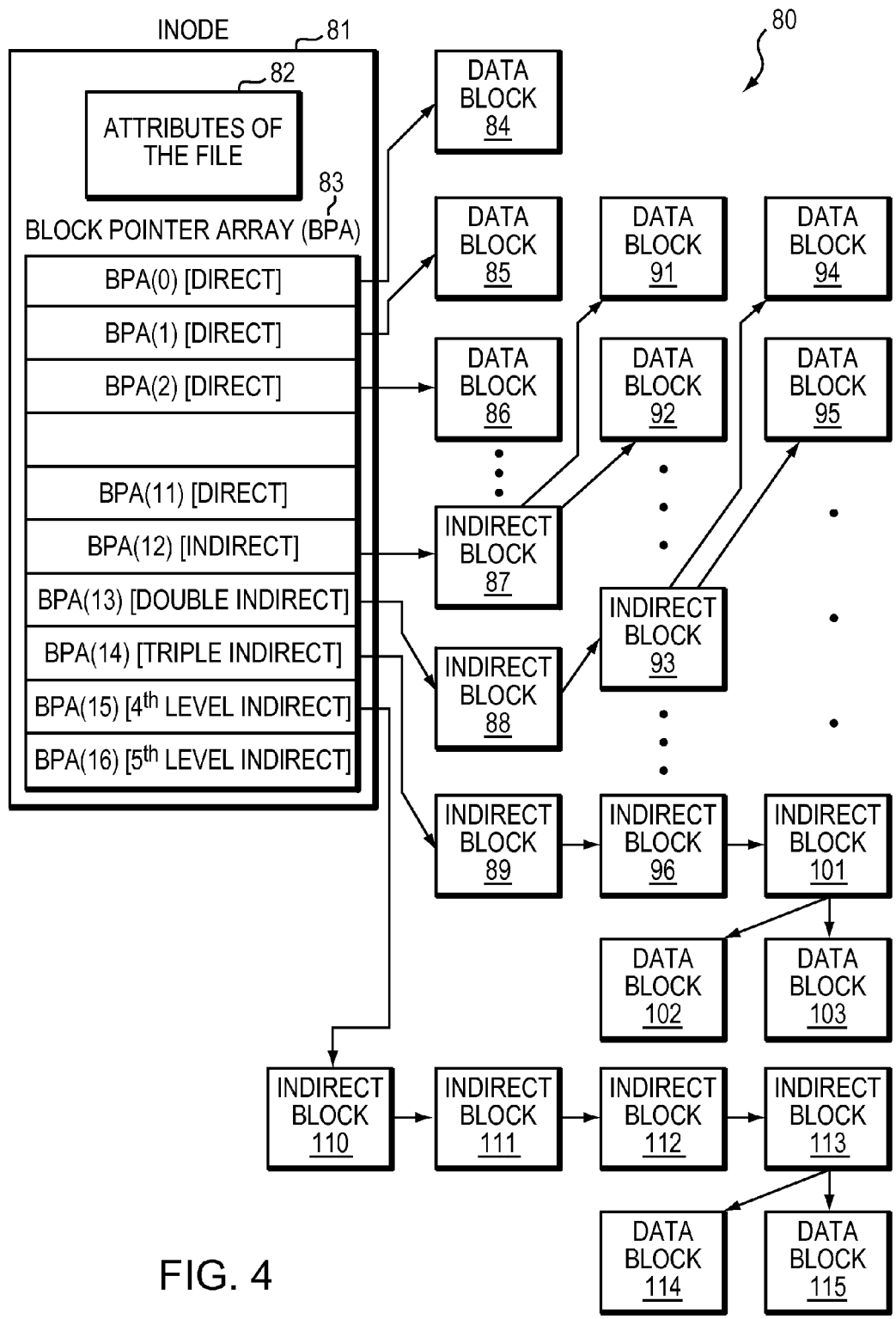

Referring to FIG. 4, shown is a representation of an inode of a file that may be included in an embodiment using the techniques described herein. A file includes an inode 81 containing attributes 82 of the file, and a block pointer array 83. The block pointer array 83 has seventeen block pointer array entries BPA(0) to BPA(16). The first of up to twelve entries BPA(0) to BPA(11) directly point to the first of up to twelve data blocks (e.g., 84, 85, 86). of the file. If the file contains more than twelve data blocks, then the thirteenth entry of the block pointer array 83 contains an indirect block pointer BPA(12) pointing to an indirect block 87 containing pointers to one or more additional data blocks (e.g., 91, 92). If the file contains so many data blocks that the indirect block 87 becomes full of block pointers, then the fourteenth entry of the block pointer array 83 contains a double indirect block pointer BPA(13) to an indirect block 88 that itself points to an indirect block 93 that points to one or more additional data blocks (e.g., 94, 95). If the file is so large that the indirect block 88 becomes full of block pointers and its descendant indirect blocks are also full of block pointers, then the fifteenth entry of the block pointer array 83 contains a triple indirect block pointer BPA(14) to an indirect block 89 that points to an indirect block 99 that points to an indirect block 101 that points to one or more additional data blocks (e.g., 102, 103). Similarly the file may include fourth (BPA(15)) and fifth (BPA(16)) level of indirections indicated by indirect blocks 110-113 and data blocks 114-115.

Generally, metadata changes of a file system resulting from an I/O request may directly be written to the file system stored on a disk, or recorded in a file system transaction log associated with the file system. A file system transaction log is used to improve performance, reliability, and recovery times of file systems. A file system transaction log offers increased reliability, because the file system transaction log may replicate some or all of the file systems metadata which can be applied to the file systems at a later time in order to make the file systems metadata consistent with changes applied to data of the file systems. However, frequent and recurring updates to the file systems may fill up the file system transaction log.

Typically, a file system transaction log only stores changes to metadata (such as inodes, directories, allocation maps) of file systems of a data storage system. If file server 23 shuts down without a failure, the file system transaction log can be discarded, because file systems stored on a persistent storage in such a case is consistent and includes all metadata changes stored in the file system transaction log. However, when file server 23 shuts down due to a failure, the file system transaction log is used to rebuild the file systems in order to restore the file systems to a consistent state. Generally, all write operations resulting in changes to metadata of a file system are first stored in the file system transaction log and corresponding metadata structures stored on a persistent storage are updated at a later time when metadata changes stored in a cache are written (or flushed) to the persistent storage. Thus, metadata structures stored on the persistent storage may contain stale data that is not consistent with metadata changes stored in the file system transaction log. Therefore, in such a case, the metadata changes stored in the file system transaction log are applied to the metadata structures stored on the persistent disk to recover the file system to a consistent state. The process of recovering a file system to a consistent state by applying metadata changes stored in the file system transaction log to a persistent storage is known as "replay of a file system transaction log".

It should be noted that a file system transaction log may be associated with a file system such that there is one separate file system transaction log for each file system of a storage system. Alternatively, it should be noted that a file system transaction log may store metadata transactions for all file systems of a storage system such that the file system transaction log serve as a global transaction log for all of the file systems of the storage system.

File system operations such as "setattr", "write", "link", "symlink", "create", "remove", "mkdir", "rmdir", and "rename" result in changes to metadata of a file system because these operations modify the file system. Each of these file system operations results in changes to metadata.

Typically, write I/O operations often includes modification of existing contents of files, and/or writing data to a portion of a storage that is pre-allocated for file systems. Thus, a write I/O operation modifies on-disk contents of a file system stored on a persistent storage. A write I/O operation using the "data sync" option writes changes to contents (or data) of a file of a large file system to a persistent storage (e.g., disk) directly as part of the write I/O operation. Thus, in such a case, in order to improve I/O performance and decrease write latency, changes in metadata of a file are logged in a memory and a file sync operation periodically flushes the changes to metadata stored in the memory to the file stored on a persistent storage at a specific time interval, and recovers the file in case of a failure by using metadata information stored in the file system transaction log.

Figure 5:
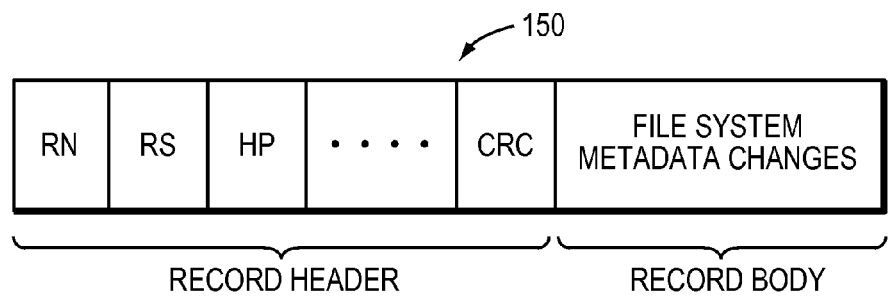

Referring to FIG. 5, shown is a logical representation of a log entry (also referred to as a "transaction record") of a file system transaction log that may be included in an embodiment using the techniques described herein. With reference also to FIG. 1, the file system transaction log 60 includes a set of log entries where each log entry includes changes to metadata associated with a file system operation (e.g. a NFS request) sent by a client connected to file server 23. A log entry 150 includes a record header and a record body. The record body of log entry 150 contains changes to metadata of a file system resulting from a transaction including a file system operation performed on the file system. The record header of log entry 150 includes a record number (RN), a record size (RS), a head pointer (HP), and a number of additional fields. The last field of the header is a cyclic redundancy check (CRC). The CRC, for example, is a thirty-two bit CRC known as "CRC32" computed by calling an operating system utility routine.

Figure 6:
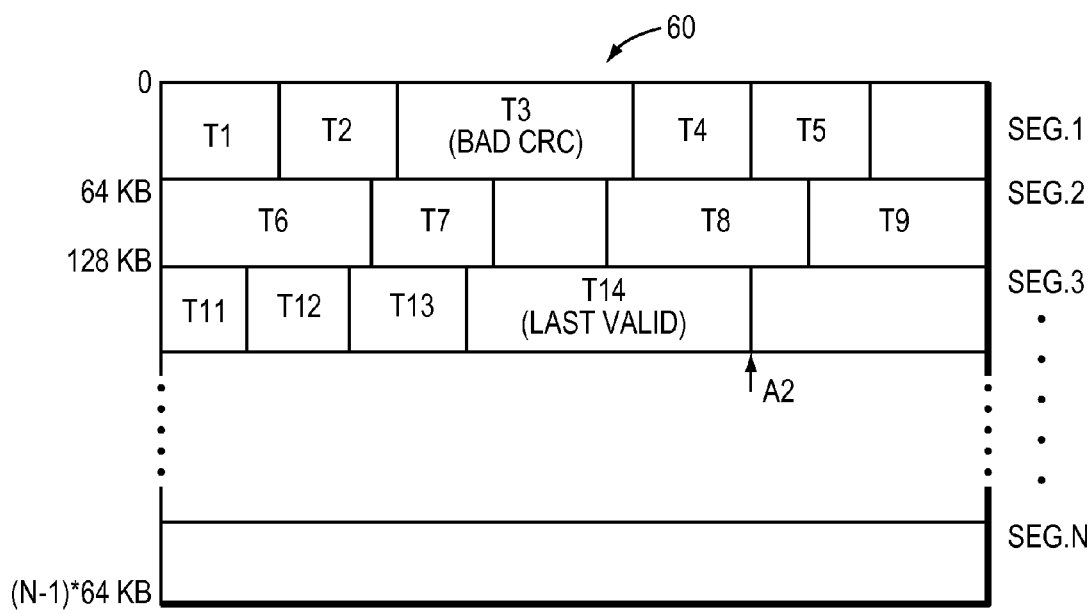

Referring to FIG. 6, shown is a logical representation of a file system transaction log that may be included in an embodiment using the techniques described herein. The file system transaction log 60 may be organized as a series of 64 kilobytes (KB) segments. A series of transactions T1 to T14 are shown in the file system transaction log 60. Within a buffer, the transactions are collected into segments of 64 KB so that no transaction crosses a segment boundary. For example, in at least one embodiment of the current technique, each transaction is rounded up to a multiple of 512 byte blocks because each 512 byte block are atomically written to a disk storage. Recovering the file system transaction log 60 includes replaying each log entry of the file system transaction log 60 starting from the first log entry to the last entry of the log 60, and flushing metadata changes stored in each log entry to respective metadata objects on a disk.

Further, the file system transaction log is organized as a sequential log where new entries are added in a sequential manner. Further, the first entry of the file system transaction log 60 is referred to as the head and the last used entry of the file system transaction log 60 is referred to as the tail. Further, the file system transaction log 60 is maintained in a circular manner in such a way that a new entry is added at the tail and when the tail reaches the end of the fixed size file system transaction log 60, a new entry overwrites an entry that resides at the head of the file system transaction log 60.

Thus, in at least one embodiment of the current technique, a new metadata transaction is stored by adding a new log entry in the file system transaction log 60 of data storage system 10. The new log entry includes information regarding changes to metadata associated with a write I/O request directed to a file of a file system. The metadata transaction represented by the new log entry is considered unfinished because no updates are applied to metadata of the file stored on a storage device at the time the transaction is considered unfinished. Further, to mark the transaction as unfinished, a log hold is acquired on the new log entry. A log hold represents a reference taken on a log entry such that the log entry indicates the current position of the file system transaction log 60 indicating that the log entry is the first transaction to be replayed when file server 23 reboots or restarts due to a failure. Thus, if file server 23 restarts or reboots due to a failure, the new log entry that has been marked as an unfinished transaction is replayed to update metadata of the file stored on storage device 215 in order to ensure consistency of the file.

Thus, if file server 23 reboots or restarts after encountering a failure, log entries of the file system transaction log 60 are replayed to ensure that metadata changes stored in the file system transaction log 60 are consistent with metadata of file systems stored a storage device. The file system transaction log 60 is replayed from its current position indicating the last valid log entry of the file system transaction log 60. A record pointer is set to point to the last valid record of file system transaction log 60. A log entry pointed to by the record is read from the file system transaction log 60. Information stored in the log entry is applied to metadata of a file stored on a storage device 215. Next, a determination is made whether the record is the last valid record of the file system transaction log 60. If the record is the last valid record, the process of replaying of the file system transaction log 60 ends. If the record is not the last valid record of the file system transaction log 60, the record pointer is incremented to point to the next valid record in the file system transaction log.

In at least one embodiment of the current technique, file server 23 includes global metadata caches such as a global cylinder group buffers cache, a global inode buffers cache, a global indirect block cache for storing metadata such as indirect block entries. Further, a global metadata cache may be organized as a set of hash buckets such that each bucket of the set of hash buckets includes one or more cache entries that are accessed by a hash key.

In at least one embodiment of the current technique, each file system of file server 23 includes a dirty list of metadata such as indirect block buffer cache entries, cylinder group buffers, and inode buffers that have been written to the file system transaction log 60 but updates have not been made to metadata of a file system stored on a disk. Further, metadata entry on a dirty list for a file system points to a cache entry residing on a global metadata cache.

Figure 7:
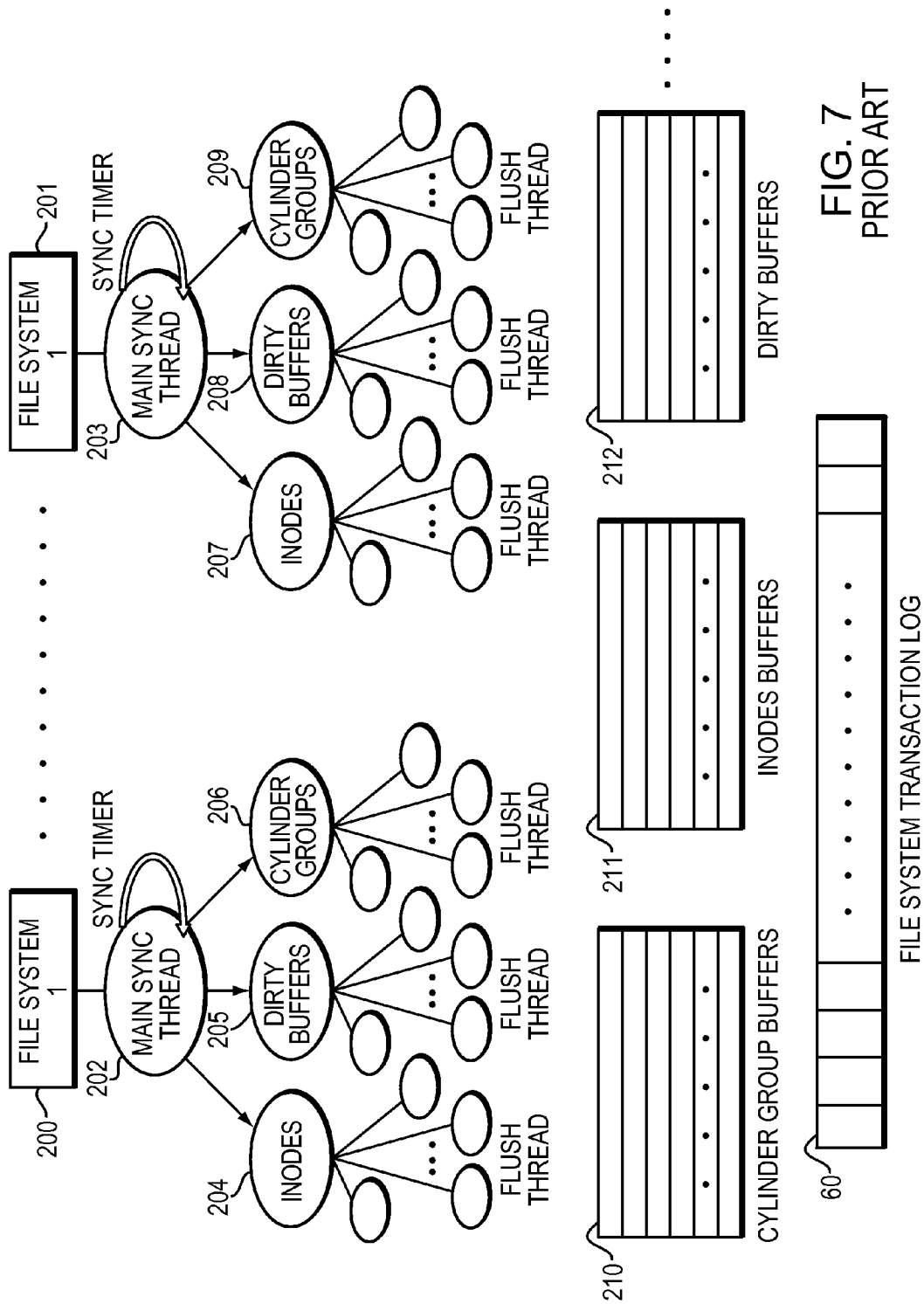
FIG. 7 is a diagram illustrating in detail components that are used in a conventional system.

Referring to FIG. 7, shown is a representation of conventional sync processes for multiple file systems in a conventional system. Conventionally, when a file system is created and mounted in a storage system, a sync timer for that file system starts with a specific time period interval such as 30 seconds. In such a conventional system, a separate sync timer is started for each file system of a data storage system. For example, sync time 202 is started for file system-1 200 and sync timer 203 is started for file system-n 201. Further, in such a conventional system, a sync timer for a file system flushes dirty metadata of the file system periodically at a specific time interval (e.g., every 30 seconds). Further, in such a conventional system, when a sync timer for a file system starts, the sync time invokes a number of flush processes (such as threads) which iterate hash lists maintained by the file system such that the hash lists include references to dirty metadata cached in global metadata caches (e.g., cylinder group buffers, dirty buffers, and inodes). The number of flush threads flushes metadata entries that are marked as dirty and are associated with the file system. For example, sync timer 202 for file system-1 200 starts a number of flush threads that iterate over hash lists 204-206 that references metadata entries for file system-1 200 residing in global metadata caches 210-212 and flushes dirty metadata entries associated with file system-1 200. Similarly, sync timer 203 for file system-n 201 starts a number of flush threads that iterate over hash lists 207-209 that references metadata entries for file system-n 201 residing in global metadata caches 210-212 and flushes dirty metadata entries associated with file system-n 201.

Further, when a cache entry is flushed from global metadata caches 210-212, an entry corresponding to the cache entry in the file system transaction log 60 is marked as complete and becomes available for reuse as a free entry. Thus, in such a conventional system, metadata cache entries are flushed in an order in which the metadata cache entries appear on hash lists 204-206 and 207-209 which may be different from the order in which corresponding entries appear on file system transaction log 60. As a result, in such a conventional system, because no specific ordering mechanism such as first-in-first-out exists for flushing dirty metadata entries, flushing of the dirty metadata entries by different sync threads creates holes in the file system transaction log 60. Generally, metadata transactions associated with write I/O requests are recorded in the file system transaction log 60 in a sequential manner, and free available entries that appear within the file system transaction log 60 among used entries can not be used out of order. As a result, in such a conventional system, a file system transaction log full condition occurs even when the free available entries exists within the file system transaction log 60.

Figure 8:
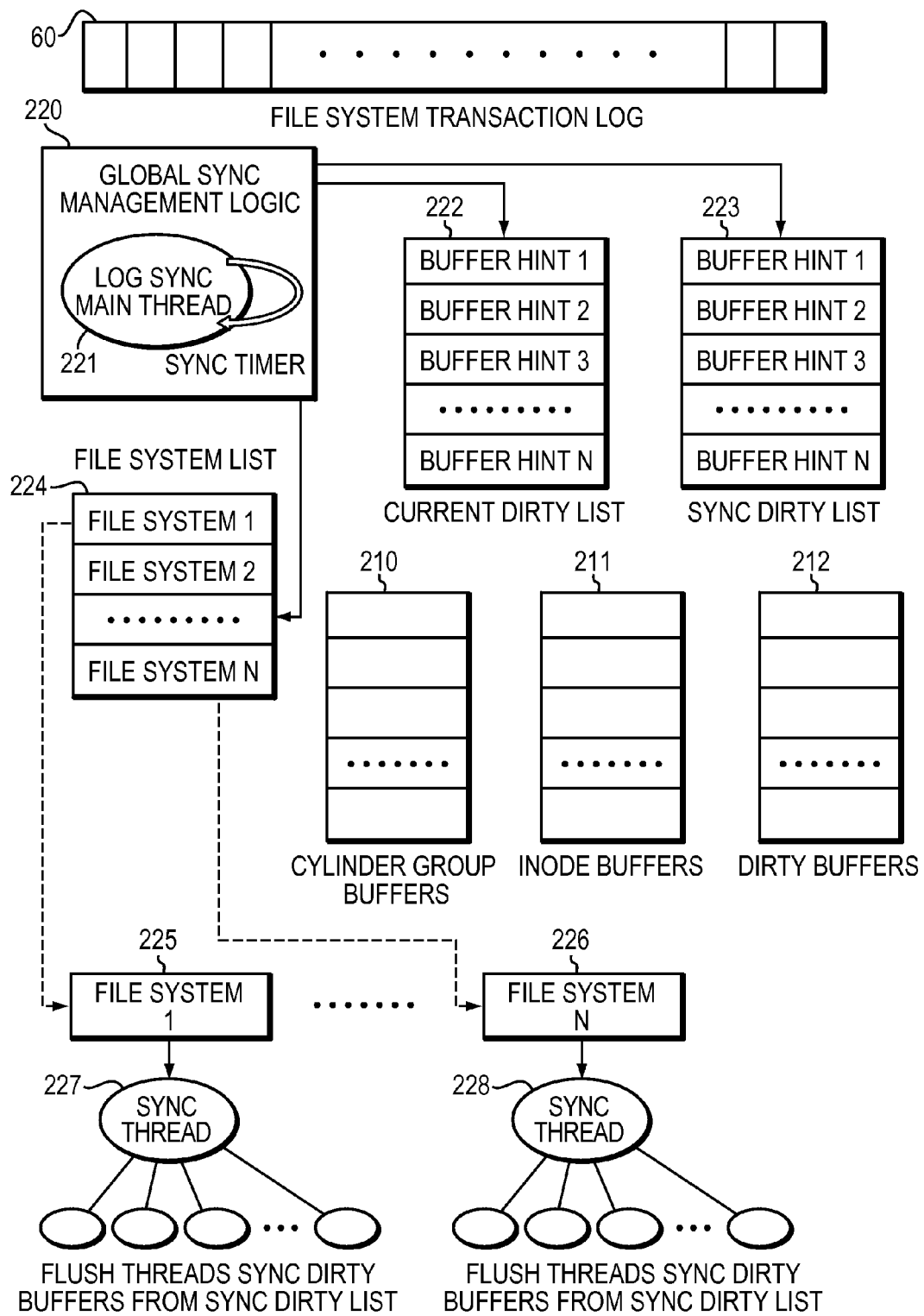
FIG. 8 is a diagram illustrating in more detail components that may be used in connection with techniques herein.

Referring to FIG. 8, shown is a detailed representation of components that may be included in an embodiment using the techniques described herein. With reference also to FIG. 1, in at least one embodiment of the current technique, global sync management logic 220 manages flushing of dirty metadata of each file system of data storage system 10 unlike a separate conventional sync process for each file system used in a conventional system. The global sync management logic 220 uses log sync thread 221 which starts periodically at a specific time interval (e.g. 30 seconds) which may be configured and changed by a user and/or data storage system 10.

In at least one embodiment of the current technique, two global sync lists are created where the first global sync list is referred to as the current dirty list 222, and the second global sync list is referred to as sync dirty list 223. The current dirty list 222 includes dirty metadata entries for each file system of data storage system 10. The sync dirty list 223 includes dirty metadata entries that are flushed when log sync thread 221 starts at the next time interval.

In at least one embodiment of the current technique, when the log sync thread 221 starts, the current dirty list 222 transitions into the sync dirty list 223 by moving each entry of the current dirty list 222 to the sync dirty list 223. Then, log sync thread 221 starts flushing each metadata entry of the sync dirty list 223. When dirty metadata entries are flushed form the sync dirty list 223, any new metadata entry that becomes dirty is added to the current dirty list 222 thereby enabling global sync management logic 220 to track newly created dirty metadata entries while previous dirty metadata entries are flushed by log sync thread 221 such that the new metadata entry is flushed next time the log sync thread 221 starts.

In at least one embodiment of the current technique, when a file system is created and mounted on file server 23, the file system is registered with the global sync management logic 220 such that the file system is added to a global list of registered file systems 224 managed by global sync management logic 220. A file system is added to the global list of registered file systems 224 as the file system is created and mounted, and a file system is removed from the global list of registered file systems 224 as the file system is unmounted.

In at least one embodiment of the current technique, log sync timer 221 flushes dirty metadata of each file system of a file server 23 by iterating over each entry of global list of registered file systems 224. For each entry of global list of registered file systems 224, log sync timer 221 sends a sync request to a file system indicated by each entry. A number of sync processes ("threads") are started for each file system that receives the sync request. The number of sync threads for a file system iterates over dirty metadata entries associated with the file system residing on sync dirty list 223 when each dirty metadata entry represents a hint (also referred to as "reference" or "soft reference") to a metadata entry cached in global metadata caches (e.g., cylinder group buffers 210, inode buffers 211 and dirty buffers 212). Further, the sync threads for a file system flushes dirty metadata entries referenced by sync dirty list 223 by committing metadata changes cached in global metadata caches 210-212 to on-disk representation of metadata of the file system. Further, when a dirty metadata entry is flushed to a storage device from global caches, corresponding metadata entry residing on global transaction log 60 is marked as finished and becomes available as a free entry to store a new metadata transaction.

Thus, in at least one embodiment of the current technique, the order in which references to dirty metadata of file systems of file server 23 appear on sync dirty list 223 and current dirty list 222 is same or similar to the order in which the dirty metadata appears on file system transaction 60 because when a metadata entry is added to file system transaction 60, a reference to the metadata entry is added to current dirty list 222.

It should be noted that even though dirty metadata is flushed in an order such as first-in-first out in which a dirty metadata entry that has been added to the file system transaction log 60 first is flushed first, multiple dirty metadata entries may be flushed concurrently by using multiple worker threads. Further, it should be noted that current dirty list 222 may be transitioned to sync dirty list 223 by simply changing a pointer that points to sync dirty list 222 to point to current dirty list 222.

Further, it should be noted that a separate log sync process 221 may be associated with each file system transaction log if there exists a separate file system transaction log for each file system of a storage system. Alternatively, it should be noted that a global log sync process may be associated with a global file system transaction log if the global file system transaction log stores metadata transaction for all of the file systems of a storage system.

Figure 9:
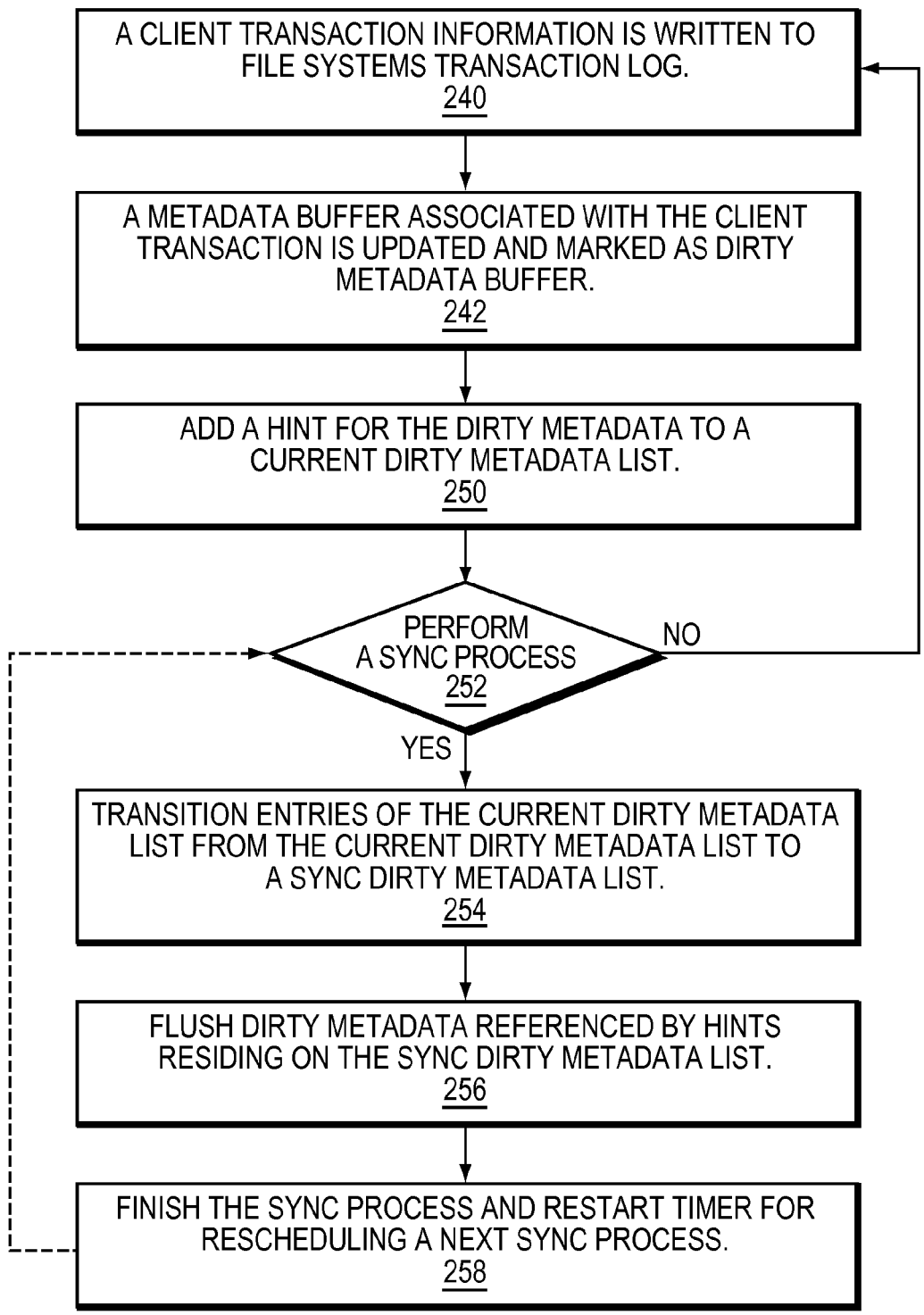
FIG. 9 is a flow diagram illustrating processes that may be used in connection with techniques herein.

Referring to FIG. 9, shown is a flow diagram illustrating a flow of data in the data storage system. With references also to FIGS. 1 and 8, in at least one embodiment of the current technique, a client transaction for a file system of a set of file systems mounted on file server 23 resulting in metadata update is written to a file system transaction log (step 240). A metadata buffer cache entry associated the client transaction is updated with changes associated with the client transaction and the metadata buffer cache entry is marked as a dirty buffer (step 242). Global sync management logic 220 adds a reference to the change in metadata indicated by the metadata buffer cache entry to current dirty list 222 (step 250). Based upon a criteria, a determination is made as to whether to perform log sync process 221 for flushing dirty metadata entries (step 252). The criteria for performing log sync 221 may be based on a specific time period interval such that when the specific time period interval expires, the log sync 221 flushes dirty metadata entries. Further, the criteria for performing log sync 221 may also be based on an event such that upon occurrence of the event, log sync 221 starts flushing dirty metadata. One such event may be a file system transaction log full condition.

Upon determining that global main sync process 221 needs to start flushing dirty metadata, the global main sync process 221 transitions current dirty list 222 to sync dirty metadata list 223 which is flushed by global main sync process 221 (step 254). The sync dirty list 223 includes references to dirty metadata entries cached in global metadata caches 210-212. The global main sync process 221 iterates over dirty metadata entries referenced by hints residing on sync dirty list 223 and flushes each dirty metadata entry which are cached in global metadata caches 210-212 (step 256). The dirty metadata entries are flushed by invoking a number of sync threads for each file system registered on file systems lists 224. For example, referencing back to FIG. 8, sync thread 225 creates multiple processes for flushing dirty metadata associated with file system-1 227 and sync thread 226 creates multiple processes for flushing dirty metadata associated with file system-n 228. When each dirty metadata entry referenced by a hint residing on sync dirty list 223 is flushed, global main sync process 221 stops and restart a timer for rescheduling the next sync operation at a specified time period interval (step 258).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing updating of metadata of file systems, the method comprising:
storing a reference to a metadata entry in a global sync list configured to sync changes to metadata of a plurality of files of a plurality of file systems, wherein a file system of the plurality of file systems is registered with the global sync list by adding the file system to a list of registered file systems managed by a global sync management logic, wherein the global sync management logic manages syncing changes from the global sync list for the file system registered with the global sync list to a storage device, wherein the metadata entry is stored in a cache of a storage system and includes a change to metadata of a file of a file system, wherein a log entry is added to a journal upon receiving an I/O request for the file of the file system, wherein the log entry includes information regarding the change to the metadata of the file of the file system, wherein the journal includes metadata transactions upon the plurality of files of the plurality of the file system, wherein the reference to the log entry is added to the global sync list in the same order the log entry is added to the journal;
creating a set of sync threads for the file system of the plurality of file systems upon receiving a request to perform a sync operation for the file system, wherein the set of sync threads iterates over references to metadata entries associated with the file system residing on the global sync list; and
performing the sync operation on the references to the metadata entries stored in the global sync list by using the set of sync threads, wherein the sync operation includes applying the change to the metadata of the file of the file system indicated by the references to the metadata entries stored in the global sync list to metadata of the file system organized on the storage device using the metadata entry stored in the cache of the storage system.

2. The method of claim 1, wherein the journal includes a persistent record created on a file system.

3. The method of claim 1, wherein the journal includes a file system transaction log, wherein the file system transaction log is associated with a file system and stored on a storage device.

4. The method of claim 1, further comprising:
storing references to changes to metadata of the plurality of files of the plurality of file systems in a global current sync list; and
transitioning the global current sync list to the global sync list.

5. The method of claim 1, further comprising:
using a log sync process for applying changes to metadata referenced in the global sync list.

6. The method of claim 5, wherein the log sync process is associated with a file system of the plurality of file systems.

7. The method of claim 1, wherein the reference to change to metadata of the file of the file system points to a metadata cache entry cached in a global metadata cache.

8. The method of claim 1, wherein a set of sync threads associated with a file system flushes change in metadata of the file system of the plurality of file systems using references residing on the global sync list.

9. The method of claim 1, wherein a reference to a change to metadata of a file of a file system is stored in a global sync list in an order in which the change to metadata is stored in the journal.

10. The method of claim 1, further comprising:
based on a criteria, invoking a log sync process for applying the change to the metadata of the file of the file system to the metadata of the file system organized on the storage device using the reference to the change stored in the global sync list.

11. A system for use in managing updating of metadata of file systems, the system comprising a processor configured to:
store a reference to a metadata entry in a global sync list configured to sync changes to metadata of a plurality of files of a plurality of file systems, wherein a file system of the plurality of file systems is registered with the global sync list by adding the file system to a list of registered file systems managed by a global sync management logic, wherein the global sync management logic manages syncing changes from the global sync list for the file system registered with the global sync list to a storage device, wherein the metadata entry is stored in a cache of a storage system and includes a change to metadata of a file of a file system, wherein a log entry is added to a journal upon receiving an I/O request for the file of the file system, wherein the log entry includes information regarding the change to the metadata of the file of the file system, wherein the journal includes metadata transactions upon the plurality of files of the plurality of the file system, wherein the reference to the log entry is added to the global sync list in the same order the log entry is added to the journal;

create a set of sync threads for the file system of the plurality of file systems upon receiving a request to perform a sync operation for the file system, wherein the set of sync threads iterates over references to metadata entries associated with the file system residing on the global sync list; and perform the sync operation on the references to the metadata entries stored in the global sync list by using the set of sync threads, wherein the sync operation includes applying the change to the metadata of the file of the file system indicated by the references to the metadata entries stored in the global sync list to metadata of the file system organized on the storage device using the metadata entry stored in the cache of the storage system.

12. The system of claim 11, wherein the journal includes a persistent record created on a file system.

13. The system of claim 11, wherein the journal includes a file system transaction log, wherein the file system transaction log is associated with a file system and stored on a storage device.

14. The system of claim 11, further comprising:
store references to changes to metadata of the plurality of files of the plurality of file systems in a global current sync list; and
transition the global current sync list to the global sync list.

15. The system of claim 11, further comprising:
use a log sync process for applying changes to metadata referenced in the global sync list.

16. The system of claim 15, wherein the log sync process is associated with a file system of the plurality of file systems.

17. The system of claim 11, wherein the reference to change to metadata of the file of the file system points to a metadata cache entry cached in a global metadata cache.

18. The system of claim 11, wherein a set of sync threads associated with a file system flushes change in metadata of the file system of the plurality of file systems using references residing on the global sync list.

19. The system of claim 11, wherein a reference to a change to metadata of a file of a file system is stored in a global sync list in an order in which the change to metadata is stored in the journal.

20. The system of claim 11, further comprising:
invoke, based on a criteria, a log sync process for applying the change to the metadata of the file of the file system to the metadata of the file system organized on the storage device using the reference to the change stored in the global sync list.

* * * * *